Patented July 14, 1936

2,047,195

UNITED STATES PATENT OFFICE 2,047,195

TREATMENT OF CELLULOSE DERIVATIVES

Henry Dreyfus, London, England

No Drawing. Application October 28, 1929, Serial No. 403,140. Renewed April 23, 1935. In France November 9, 1928

6 Claims. (Cl. 8—20)

This invention relates to the treatment of filaments, threads, yarns, ribbons, films and the like made of or containing cellulose acetate or other cellulose esters or ethers, and also to the production by dry or semi-dry spinning methods of filaments, threads, ribbons and films from solutions of such cellulose derivatives.

The process of the invention aims more particularly at increasing the tensile strength, extensibility and/or elasticity of the materials, and/or at modifying their lustre.

According to the present invention materials made of or containing cellulose esters or ethers are treated subsequent to their production or in the course of or continuously with their production by dry or semi-dry spinning processes with liquids having a solvent or strong swelling action upon the cellulose derivatives. The materials may be subjected to the action of such reagents while under tension or may be stretched immediately after the treatment, or alternatively the treatment may be applied under such conditions that the materials are allowed to shrink. The invention particularly aims at using the reagents at such concentrations or under such conditions that a superficial filming of the individual filaments or the like takes place and the time and conditions of treatment may be so adjusted as to limit the action to the surface of the materials under treatment. Particularly valuable results are obtained if the concentrations or conditions under which the reagents are applied are such that the filaments, threads, yarns etc. are brought into a plastic state, that is to say into a condition in which they do not exhibit elasticity. It will therefore be appreciated that the present invention especially contemplates applying solvents or strong swelling agents in high concentration.

As examples of suitable reagents I use in the process of the present invention, the following may be mentioned:—acetic acid, formic acid, lactic acid, acetone, di-acetone alcohol, the mono or di-ethers of olefine glycols and of poly olefine glycols, for instance the mono and di-methyl and ethyl ethers of ethylene and propylene glycols and the mono methyl ether of di-ethylene glycol, di-ethyl tartrate, ethyl lactate, phenols, mono-, di- and tri-acetins, thio-cyanates, for example of ammonia or alkali or alkaline earth metals, zinc chloride and the like. Mixtures of such reagents may be employed for instance, mixtures of acetone and di-acetone alcohol. Solvent liquids are preferably diluted with a non-solvent liquid or diluent, for instance water, benzene or the like.

Preferably the reagents employed are such that by reason of their innocuous properties they need not be washed out of the materials and can remain therein to be removed by evaporation only. The best results have been obtained with relatively non-volatile organic solvents diluted with a non-solvent diluent, for example aqueous solutions of a di-acetone alcohol, di-ethyl tartrate, mono or di-acetin and ethyl lactate.

The time of treatment will depend upon the reagent employed, upon its concentration and upon the temperature, and in general the time and/or concentration may be decreased with increasing temperature. It is not in all cases necessary to use a reagent of sufficient concentration to produce the required superficial solvent effect, since lower concentrations may be employed and the required concentration be allowed to develop on the fibre or material, for example by evaporation of a diluent. Thus, for example, aqueous solutions of the relatively non-volatile organic reagents referred to above may be allowed to dry in or evaporate on the materials. This drying or evaporation appears to render the materials treated noticeably denser. The concentration of the reagents or the conditions under which they are applied may be varied with the type of material being treated and with its cross-section. Di-acetone alcohol, di-ethyl tartrate and ethyl lactate may, for example, be employed in aqueous or alcoholic solution in a concentration of 25 to 65%.

As stated above finished filaments, threads, yarns, and other materials produced by any suitable process may be treated, but care should be taken that the concentration of the reagents employed should not be such as to produce a substantial solution of the cellulose derivative, since this may result in adhesion of the separate filaments or threads. The same considerations apply in the treatment of filaments and threads continuously with their production by dry or semi-dry spinning processes. It is however possible in the treatment of filaments proceeding from a dry-spinning apparatus to maintain the filaments in separated form by the use of reeds, combs or the like arranged to receive and separate the individual filaments.

In carrying out the processes of the present invention the materials may be sprayed with the treating agents or may be passed through a bath of the same, or mechanical impregnation methods, may be employed. The reagents are preferably allowed to remain on the materials for some time to exert their solvent or strong swelling action and after the treatment they may, if desired or requisite, be removed, for example by washing out.

A very convenient method of procedure according to the present invention is to carry filaments, for example of cellulose acetate, from a dry-spinning cell through a reed or comb immersed in a bath of a suitable reagent, for example of 45 to 55% aqueous solution of di-acetone alcohol (used at room temperature), the length of immersion depending on the temperature and the concentration of the reagent. From the bath the filaments may be given a suitable air run, carried through a second reed or comb, and finally, if desired through a suitable washing bath.

In the case of a 45 to 55% aqueous di-acetone alcohol solution a very convenient washing bath is a di-acetone alcohol solution of lower concentration, for example 10 to 20%. Alternatively the filaments may be passed to a centrifugal spinning box and washed therein.

In another form of treatment according to the present invention the reagent may be applied to the filaments or threads in the course of their production and while they still contain a considerable proportion of residual solvent. To effect this the various methods described in U. S. application S. No. 393,288 dated 17th September 1929 may be employed. For example the filaments may be passed in contact with a wick supplied with the solvent or strong swelling agent from a suitable vessel. Here again care should be taken to avoid mutual contact of the individual filaments in the case of using concentrations of reagents liable to cause adhesion. As described in the said application No. 393,288 a dry-spinning process employing a line of spinning orifices or jets is very convenient.

The processes of the present invention may be applied to the treatment or production of filaments (of all types, including the so-called hollow filaments) yarns, threads, ribbons, and other products made of any cellulose esters or ethers, for example cellulose acetate, cellulose formate, cellulose propionate, cellulose butyrate, methyl cellulose, ethyl cellulose and benzyl cellulose or containing such cellulose esters or ethers doubled, mixed or associated with other fibres for example wool, silk, cotton or the cellulosic type of artificial silk (rayon).

As stated above the processes of the present invention result in general in an increase in the tensile strength, extensibility and/or elasticity of the materias and according to the concentrations, temperatures and times of treatment may result in a modification of the lustre.

The following examples illustrate the invention, but are not to be considered as limiting it in any way.

*Example 1*

A 25 to 30% solution of cellulose acetate is dry spun at a speed of 50 to 60 metres per minute in any suitable dry spinning apparatus, the filaments being drawn out of the spinning cell and carried round a feed drum or roller. The filaments are then passed directly through a bath containing a 45 to 55% aqueous solution of di-acetone alcohol at room temperature, the length of immersion being about 10 to 20 centimetres. From the bath the filaments are collected, excess of solvent removed therefrom, and the filaments finally dried. Very conveniently the filaments may be passed into a centrifugal spinning box in which they are washed with an aqueous solution of di-acetone alcohol of a concentration of 10 to 20%.

*Example 2*

Hanks of cellulose acetate artificial silk are sprayed with an aqueous solution containing 30% of di-acetone alcohol and 15% of acetone. The solvent liquid is allowed to remain on the hanks for some time after which the yarn is washed by spraying with an aqueous solution of di-acetone alcohol of 10 to 15% strength. The treated material possesses a high tenacity and lustre similar to that of natural silk.

*Example 3*

A 25 to 30% solution of cellulose acetate is dry spun as in Example 1 and is then carried into a bath containing a 45% aqueous solution of ethyl lactate in place of the di-acetone alcohol solution used in Example 1. The filaments so treated may be collected and washed, for example with a solution of ethyl lactate of lower concentration, or with a solution of common salt or other neutral salt.

*Example 4*

A 25 to 30% solution of cellulose acetate is dry spun as in Example 1, and the filaments carried into a bath containing 50% of di-acetone alcohol and 50% of ethyl alcohol. The filaments are thereafter treated as in Example 1.

As indicated above the materials may be stretched during any of the above treatments or may be stretched immediately after the treatment or may be allowed to shrink during the treatment. By stretching during or after the treatment products of small cross-section or low denier may be produced.

What I claim and desire to secure by Letters Patent is:—

1. A process for the treatment of threads, filaments and the like, comprising cellulose acetate, characterized in that said materials are treated with aqueous di-acetone alcohol in concentration from 25 to 65% to render them plastic and are stretched while in plastic condition.

2. A process for the treatment of threads, filaments and the like, comprising cellulose acetate characterized in that said materials are treated with aqueous di-ethyl tartrate in concentration from 25 to 65% to render them plastic and are stretched while in plastic condition.

3. A process for the treatment of threads, filaments and the like, comprising cellulose acetate, characterized in that said materials are treated with aqueous ethyl lactate in concentration from 25 to 65% to render them plastic and are stretched while in plastic condition.

4. A process for the treatment of threads, filaments and the like comprising an organic derivative of cellulose, characterized in that said materials are treated with a solution of a solvent, in such concentration that the solution is equivalent in softening power to a 25 to 65% aqueous solution of a substance selected from the group consisting of di-acetone alcohol, diethyl tartrate and ethyl lactate, to render them plastic and are stretched while in plastic condition.

5. A process for the treatment of threads, filaments and the like comprising cellulose acetate, characterized in that said materials are treated with an aqueous solution of a solvent, in such concentration that the solution is equivalent in softening power to a 25 to 65% aqueous solution of a substance selected from the group consisting of diacetone alcohol, diethyl tartrate and ethyl lactate, to render them plastic and are stretched while in plastic condition.

6. A process for the treatment of threads, filaments and the like comprising cellulose acetate, characterized in that said materials are treated with an aqueous solution of a solvent, in such concentration that the solution is equivalent in softening power to a 45 to 55% aqueous solution of diacetone alcohol, to render them plastic and are stretched while in plastic condition.

HENRY DREYFUS.